United States Patent
Tanno et al.

(10) Patent No.: US 8,085,785 B2
(45) Date of Patent: Dec. 27, 2011

(54) MOBILE STATION, A BASE STATION, A MOBILE COMMUNICATION SYSTEM AND A COMMUNICATION CONTROL METHOD

(75) Inventors: Motohiro Tanno, Yokohama (JP); Sadayuki Abeta, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 625 days.

(21) Appl. No.: 11/911,518

(22) PCT Filed: Apr. 13, 2006

(86) PCT No.: PCT/JP2006/307842
§ 371 (c)(1),
(2), (4) Date: Jan. 12, 2009

(87) PCT Pub. No.: WO2006/109851
PCT Pub. Date: Oct. 19, 2006

(65) Prior Publication Data
US 2009/0213786 A1 Aug. 27, 2009

(30) Foreign Application Priority Data
Apr. 13, 2005 (JP) .................. 2005-116109

(51) Int. Cl.
*H04L 12/28* (2006.01)
*H04B 7/005* (2006.01)
*H04W 4/00* (2009.01)
(52) U.S. Cl. ................ 370/395.4; 370/278; 370/329
(58) Field of Classification Search ............... 370/252, 370/310–350, 431, 437
See application file for complete search history.

(56) References Cited

U.S. PATENT DOCUMENTS

| | | | |
|---|---|---|---|
| 5,157,709 A | 10/1992 | Ohteru | |
| 5,594,738 A * | 1/1997 | Crisler et al. | 370/347 |
| 5,729,542 A * | 3/1998 | Dupont | 370/346 |
| 6,920,148 B1 * | 7/2005 | Kato | 370/442 |
| 7,760,680 B2 * | 7/2010 | Chen et al. | 370/328 |
| 2002/0009069 A1 * | 1/2002 | Kobayashi | 370/344 |
| 2002/0114287 A1 * | 8/2002 | Gupta et al. | 370/252 |
| 2003/0007466 A1 * | 1/2003 | Chen | 370/328 |
| 2003/0060207 A1 * | 3/2003 | Sugaya et al. | 455/450 |
| 2003/0073409 A1 | 4/2003 | Nobukiyo et al. | |
| 2004/0038684 A1 | 2/2004 | Sugaya | |
| 2004/0127225 A1 | 7/2004 | Qiu et al. | |
| 2004/0190482 A1 * | 9/2004 | Baum et al. | 370/347 |

(Continued)

FOREIGN PATENT DOCUMENTS
CN 1424835 A 6/2003
(Continued)

OTHER PUBLICATIONS

Office Action in Chinese with Patent Application No. 200680012408. 4, dated Aug. 27, 2010, with English translation thereof (23 pages).

(Continued)

*Primary Examiner* — Warner Wong
(74) *Attorney, Agent, or Firm* — Osha • Liang LLP

(57) ABSTRACT

There is disclosed a mobile station performing packet communications with a base station, including: a reservation control signal generating unit configured to generate a reservation control signal, based on control information transmitted in advance of a data packet; and a reservation control signal transmission control unit configured to transmit the reservation control signal at a predetermined timing.

10 Claims, 26 Drawing Sheets

U.S. PATENT DOCUMENTS

| | | | |
|---|---|---|---|
| 2004/0202181 A1* | 10/2004 | Mitchell | 370/395.4 |
| 2005/0037766 A1* | 2/2005 | Hans et al. | 455/450 |
| 2010/0254263 A1 | 10/2010 | Chen et al. | |

FOREIGN PATENT DOCUMENTS

| | | | |
|---|---|---|---|
| CN | 1497995 | | 5/2004 |
| JP | 2-312492 | A | 12/1990 |
| JP | 04-200032 | A | 7/1992 |
| JP | 2000-175247 | B1 | 3/2000 |
| JP | 2001-148713 | A | 5/2001 |
| JP | 2002-204477 | A | 7/2002 |
| JP | 2003-163962 | A | 6/2003 |
| JP | 2003-199173 | | 7/2003 |
| JP | 2004-023143 | A | 1/2004 |
| JP | 2004-040336 | A | 2/2004 |
| JP | 2004/248263 | | 9/2004 |
| JP | 2004/350293 | | 12/2004 |

OTHER PUBLICATIONS

Via espacenet, abstract for CN 1497995, dated May 19, 2004, not available, corresponding document EP 1406419, dated Apr. 7, 2004, (1 page).

International Search Report dated Jul. 18, 2006 issued in PCT/JP2006/307842, with English translation, 5 pages.

Office Action in Japanese with Patent Application No. 2005-116109, mailed Sep. 7, 2010, with partial English translation thereof (5 pages).

Patent Abstracts of Japan for Publication No. 2004-350293, Publication Date Dec. 9, 2004 (1 pages).

Patent Abstracts of Japan with Publication No. 2004-248263, dated Sep. 2, 2004 (1 pages).

3GPP TS 25.211 V5.6.0; 3rd Generation Partnership Project; Technical Specification Group Radio Access Network; "Physical Channels and Mapping of Transport Channels Onto Physical Channels (FDD)"; (Release 5), Sep. 2004 (51 pages).

3GPP TS 25.214 V5.10.0; 3rd Generation Partnership Project; Technical Specifiation Group Radio Access Network; "Physical Layer Procedures (FDD)"; (Release 5), Dec. 2004 (64 pages).

Chinese Office Action for Application No. 200680012408.4, mailed on Jun. 9, 2011 (13 pages).

esp@cenet Patent Abstract for Chinese Publication No. 1424835 publication date Jun. 18, 2003. (1 page).

Japanese Office Action for Application No. 2005-116109, mailed on Feb. 1, 2011 (5 pages).

Patent Abstracts of Japan for Japanese Publication No. 2003-163962, publication date Jun. 6, 2003 (1 page).

Patent Abstracts of Japan for Japanese Publication No. 2001-148713, publication date May 29, 2001 (1 page).

Patent Abstracts of Japan for Japanese Publication No. 04-200032, publication date Jul. 21, 1992 (1 page).

Patent Abstracts of Japan for Japanese Publication No. 2000-175247, publication date Jun. 23, 2000 (1 page).

* cited by examiner

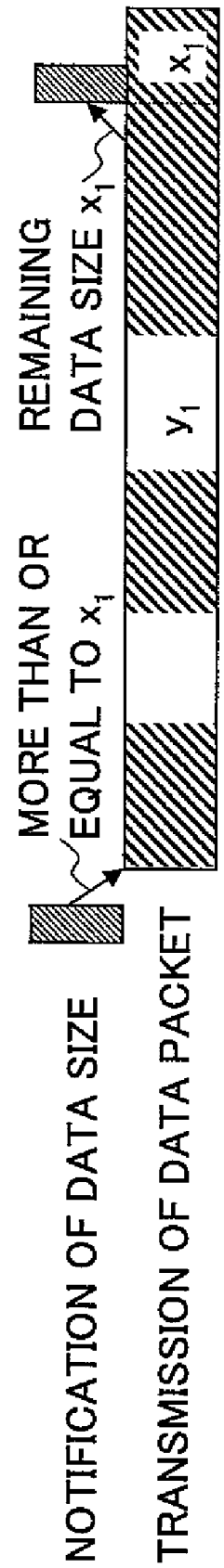

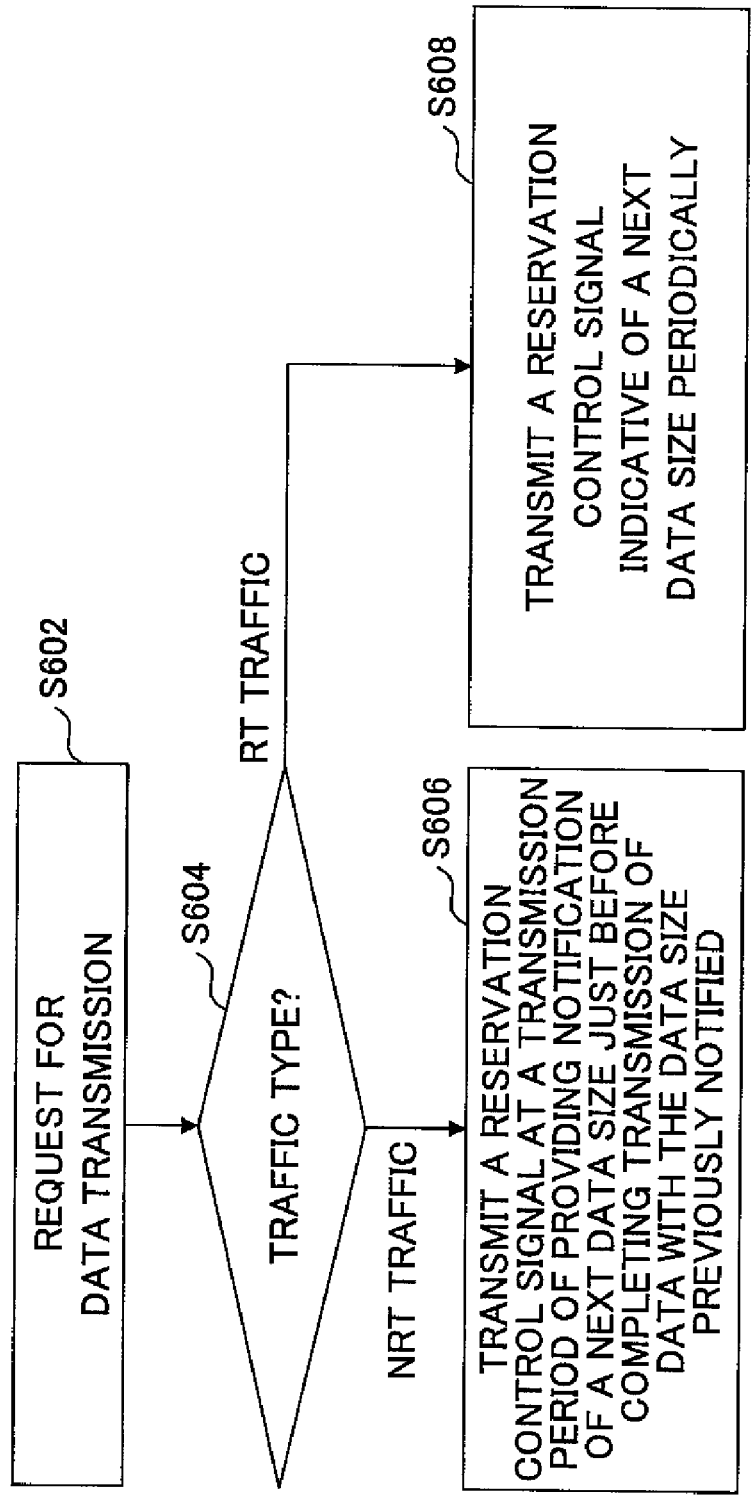

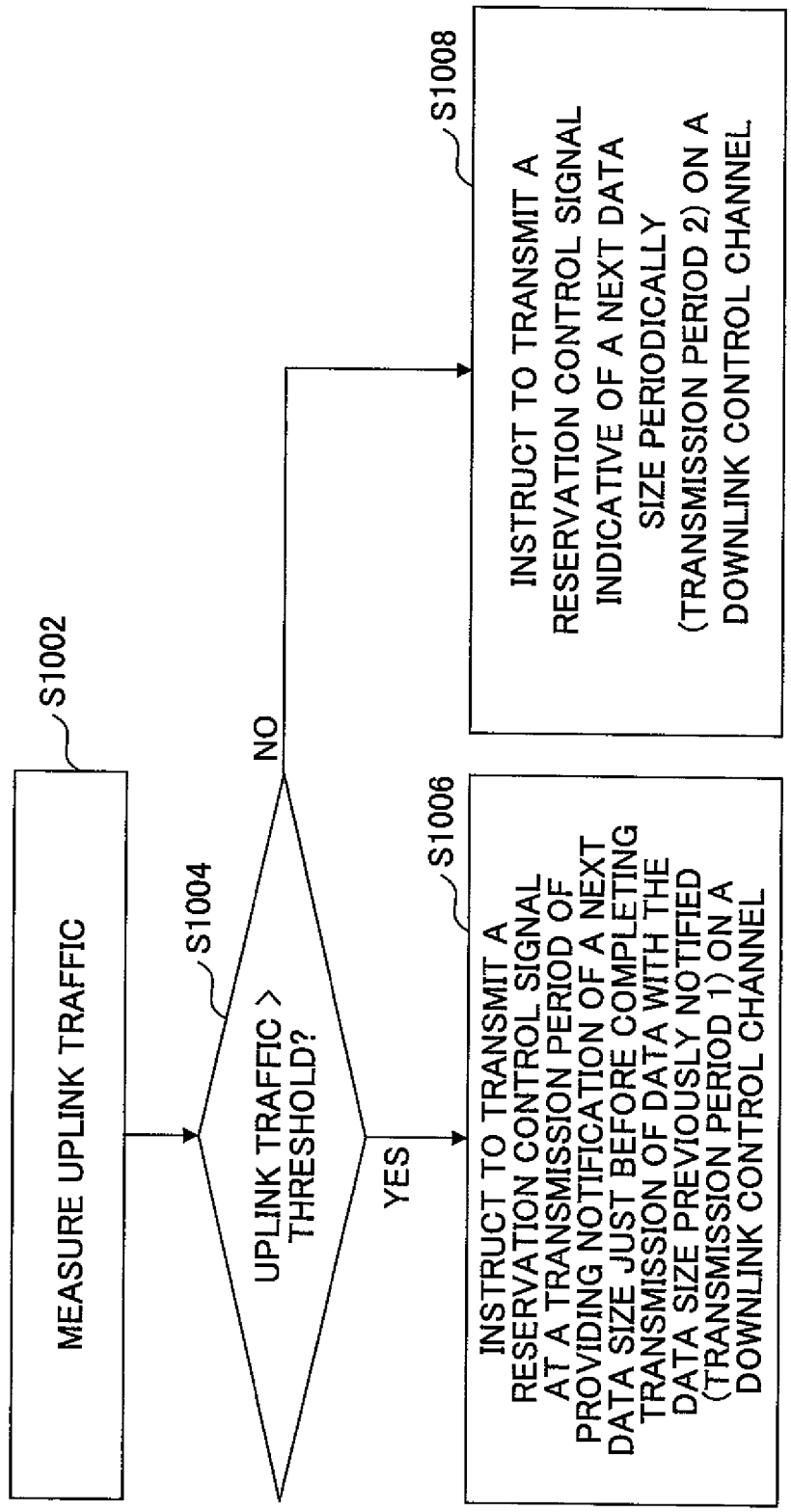

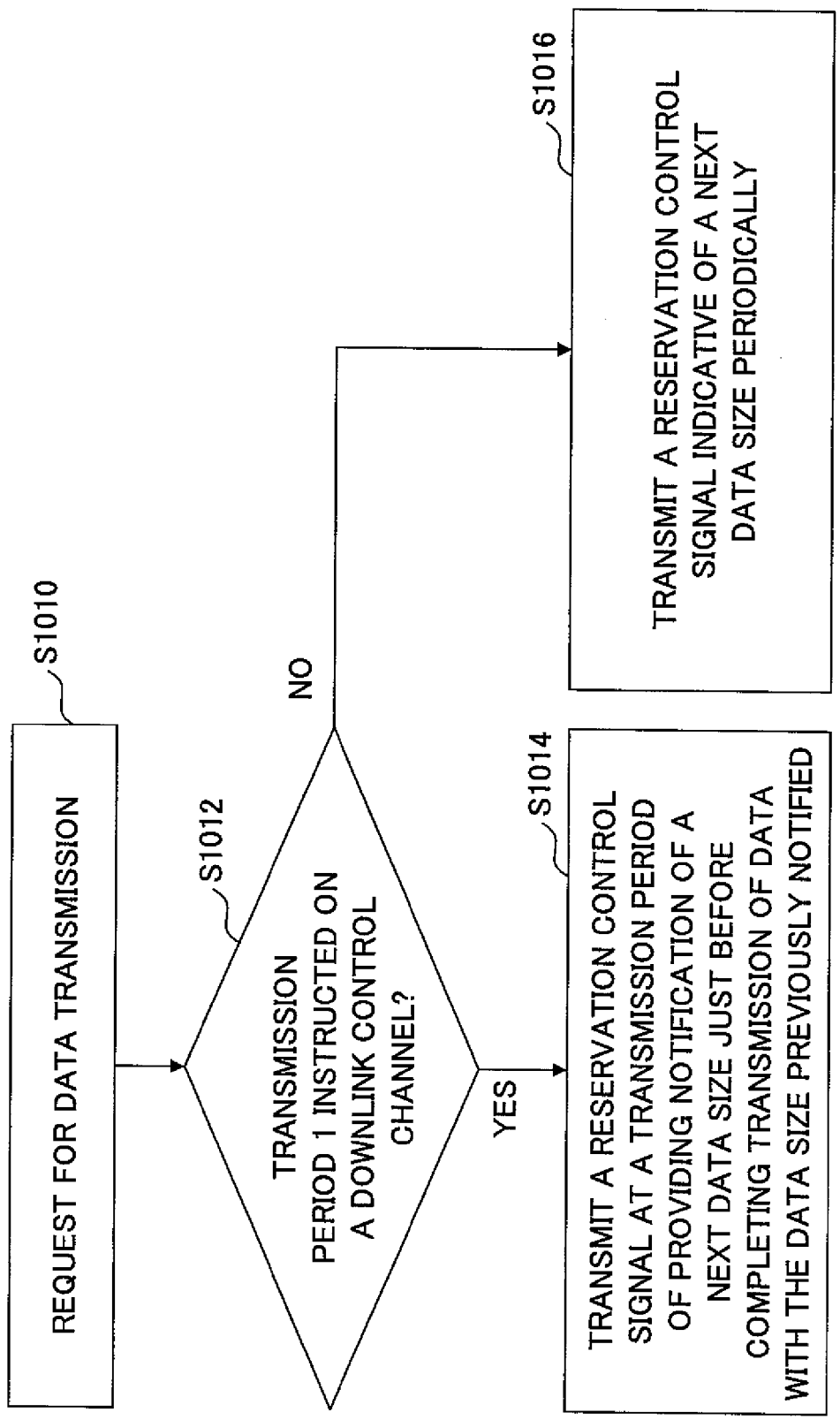

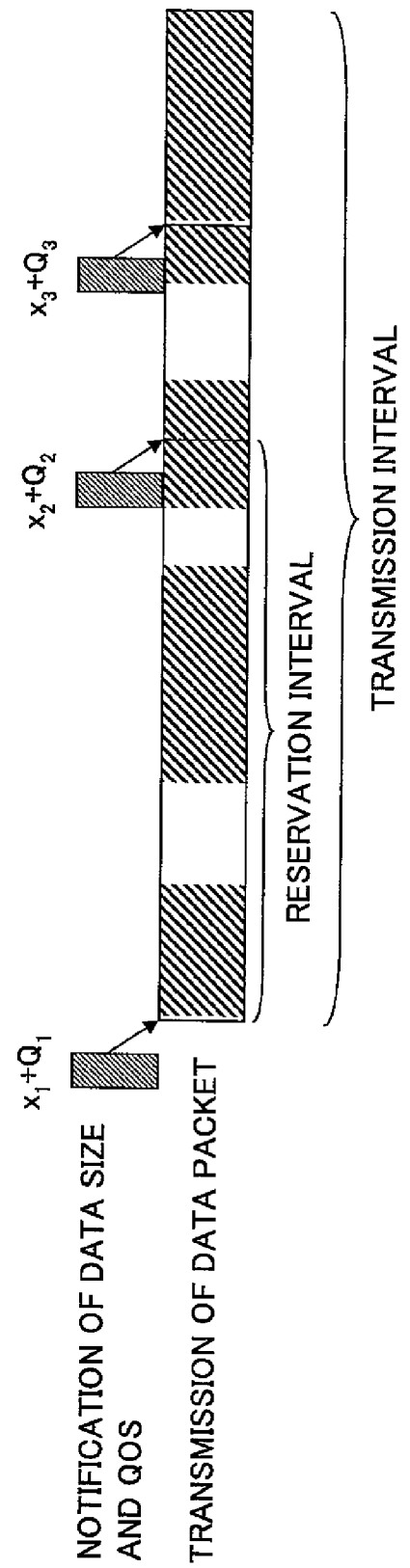

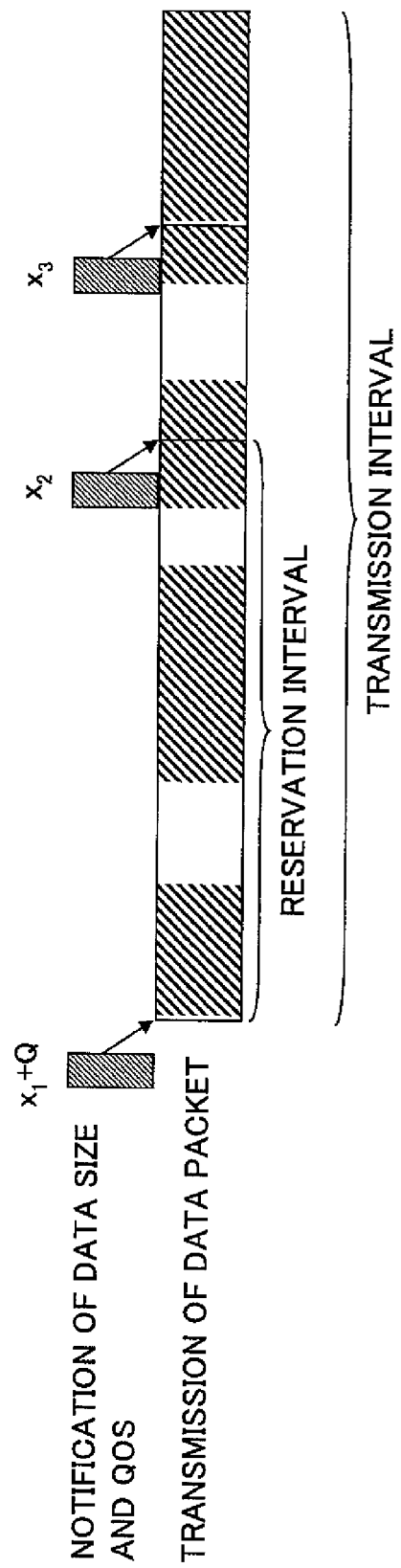

MOBILE STATION, A BASE STATION, A MOBILE COMMUNICATION SYSTEM AND A COMMUNICATION CONTROL METHOD

BACKGROUND OF THE INVENTION

1. Field of the Invention

The present invention relates to a mobile station, a base station, a mobile communication system, and a communication control method where communications are carried out in the form of uplink reservation-based packet access.

2. Description of the Related Art

In the 3rd generation (3G) mobile communication system, data communications are carried out in the form of circuit switching. In the 3G system, random access is defined which has some similarities to reservation-based access in operations (for example, Non-Patent Reference 1).

Specifically, when a request for data transmission is generated in a mobile station, the mobile station notifies a base station of the request for data transmission by means of a Preamble. A Preamble is a form of reservation control signal for notifying the base station of a request for data transmission. The following data packet is fixed in length.

Under random access in the 3G system, when transmission data is long compared to the length of a data packet, for example, Preambles are frequently transmitted, because the size of data which can be transmitted at every random access is predetermined. As a result, it presents a problem that overhead and delay may increase. In order to handle this problem in the 3G system, a dedicated data channel is used. However, it presents a problem that delay for configuring the dedicated data channel may occur. Further, it presents a problem that channel resources may be occupied for a certain amount of time, even if transmission data does not exist.

When transmission data is short compared to the length of a data packet, the 3G system is inefficient, because wasteful transmission may occur.

In the future, reservation-based packet access will be necessary which supports various data sizes and requests for QoS, and a method of efficiently transmitting a reservation control signal under this reservation-based packet access will be a matter of concern.

[Non-Patent Reference 1] 3GPP TS25.211, 25.214

SUMMARY OF THE INVENTION

Problem(s) to be solved by the Invention

However, the above-mentioned background technologies present the following problems.

In next-generation radio access, uplink reservation-based packet access is under discussion for uplink transmission. Under this uplink reservation-based packet access, the mobile station transmits a request for transmission to the base station, when data to be transmitted is generated. The base station gives a grant based on the request for transmission, and then the mobile station transmits data in accordance with the grant from the base station.

Under this uplink reservation-based packet access, frequently transmitting control information allows for detailed scheduling control in view of the most current conditions. Accordingly, it is possible to enhance the effect of user diversity while satisfying the request for quality of service for each user, and then increase throughput of the system. However, it presents a problem that overhead may increase.

Therefore, detailed scheduling control with reduced overhead is needed, by transmitting control signals with the minimum timing and periodicity in accordance with their purposes.

Consequently, it is a general object of the present invention to provide a mobile station, a base station, a mobile communication system, and a communication control method where control information about the reservation for uplink reservation-based packet access can be transmitted at a timing and periodicity in accordance with its purpose.

Means for solving the Problem

In one aspect of the present invention, there is provided a mobile station performing packet communications with a base station, including:

a reservation control signal generating unit configured to generate a reservation control signal, based on control information transmitted in advance of a data packet; and a reservation control signal transmission control unit configured to transmit the reservation control signal at a predetermined timing.

The mobile station as configured above can transmit the reservation control signal to the base station at a predetermined timing.

Further, there is provided a base station performing packet communications with a mobile station, including:

a traffic measurement unit configured to measure traffic on an uplink channel from the mobile station to the base station;

a traffic determination unit configured to determine whether the base station can accept a reservation control signal from the mobile station, based on a condition of the measured traffic on the uplink channel; and a control signal generating/transmission unit configured to generate and transmit a control signal for preventing the mobile station from transmitting the reservation control signal, based on the result of the determination.

The base station as configured above can control transmission of the reservation control signal from the mobile station.

Further, there is provided a mobile communication system including a mobile station and a base station performing packet communications with the mobile station, where:

the base station includes a traffic measurement unit configured to measure traffic on an uplink channel;

a traffic determination unit configured to determine whether the base station can accept a reservation control signal from the mobile station, based on a condition of the measured traffic on the uplink channel; and a control signal generating/transmission unit configured to generate and transmit a control signal for preventing the mobile station from transmitting the reservation control signal, based on the result of the determination; and the mobile station includes a reservation control signal generating unit configured to generate the reservation control signal, based on control information transmitted in advance of a data packet; and a reservation control signal transmission control unit configured to transmit the reservation control signal at a predetermined timing, when a transmission grant for the reservation control signal to the base station is accepted.

The mobile communication system as configured above allows the mobile station to transmit the reservation control signal to the base station at a predetermined timing, when a transmission grant for the reservation control signal is accepted.

Further, there is provided a communication control method in a mobile communication system including a mobile station and a base station performing packet communications with the mobile station, including the steps of:

detecting a request for data transmission;

generating a reservation control signal, based on control information transmitted in advance of a data packet; and transmitting the reservation control signal at a predetermined timing.

The communication control method as configured above allows the mobile station to transmit the reservation control signal to the base station at a predetermined timing.

EFFECT OF THE INVENTION

According to an embodiment of the present invention, a mobile station, a base station, a mobile communication system, and a communication control method are achieved, where control information about the reservation for uplink reservation-based packet access can be transmitted at a timing and periodicity in accordance with its purpose.

BRIEF DESCRIPTION OF THE DRAWINGS

FIG. 5A shows a transmission period of a reservation control signal.

FIG. 6 shows a flowchart illustrating an operation of a mobile station in accordance with an embodiment of the present invention.

FIG. 10A shows a flowchart illustrating an operation of a base station in accordance with an embodiment of the present invention.

FIG. 10B shows a flowchart illustrating an operation of a mobile station in accordance with an embodiment of the present invention.

FIG. 11 shows a transmission period of a reservation control signal.

FIG. 12 shows a transmission period of a reservation control signal.

DESCRIPTION OF THE PREFERRED EMBODIMENTS

Description of Notations

Figure 1:
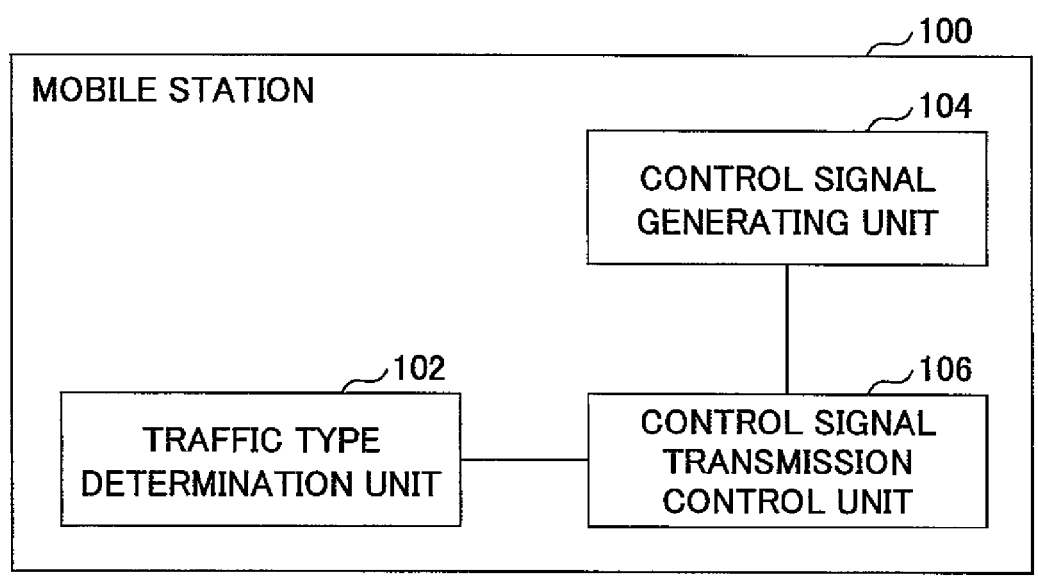
FIG. 1 shows a block diagram of a mobile station in accordance with an embodiment of the present invention.

100 mobile station
200 base station

BEST MODE OF CARRYING OUT THE INVENTION

A description of embodiments of the present invention is given below, with reference to the accompanying drawings.

Throughout figures for illustrating the embodiments, corresponding elements are referenced by the same reference numerals, and the repetitive descriptions are omitted.

A mobile communication system in accordance with an embodiment of the present invention includes a base station and a mobile station capable of radio communications with the mobile station.

The mobile station transmits the following control information in advance of transmitting data packets:

(1) a requested data size (an information rate) or a buffer status of the mobile station, (2) a request for quality of service (QoS), and/or (3) a downlink channel condition or transmission power of the mobile station.

The mobile station also transmits data packets in accordance with the allocation of transmission slots by the base station. The base station performs scheduling based on both the received control information and the measured uplink channel conditions.

With reference to FIG. 1, a description is given below with regard to a mobile station 100 in accordance with a first embodiment of the present invention.

The mobile station 100 in accordance with the first embodiment includes a traffic type determination unit 102, a control signal generating unit 104, and a control signal transmission control unit 106 connected to both the traffic type determination unit 102 and the control signal generating unit 104.

The traffic type determination unit 102 determines a traffic type of transmission data, for example. The traffic type determination unit 102 determines whether transmission data is generated randomly in a burst manner (hereinafter referred to as Non-Real-Time traffic) or transmission data is generated regularly at a constant rate (hereinafter referred to as Real-Time traffic), for example.

The control signal generating unit 104 generates a control signal based on control information.

As described above, the control information includes:

(1) a requested data size (an information rate, in the case of transmission at a constant rate) or a buffer status of the mobile station, (2) a request for quality of service (QoS), and/or (3) a downlink channel condition or transmission power of the mobile station.

The control signal transmission control unit 106 transmits a control signal based on the result of the determination by the traffic type determination unit 102.

In the first embodiment, a description is given below with regard to transmitting, as control information, (1) a requested data size, an information rate, or a buffer status of the mobile station 100.

At the start of data communications, the total data size cannot be determined by the mobile station. Specifically, the mobile station 100 cannot determine whether data is in the process of being stored in the buffer, or data is being further transmitted even if data is not stored in the buffer. Therefore, the mobile station 100 sometimes issues a request for the data size to the base station 200. In other words, the control signal transmission control unit 106 transmits control signals at a predetermined timing.

For example, the control signal transmission control unit 106 provides notification of a next data size just before completing transmission of data with the data size previously notified (or reserved). In this case, the next data size is calculated from the data size in the buffer at the present time.

Figure 2:
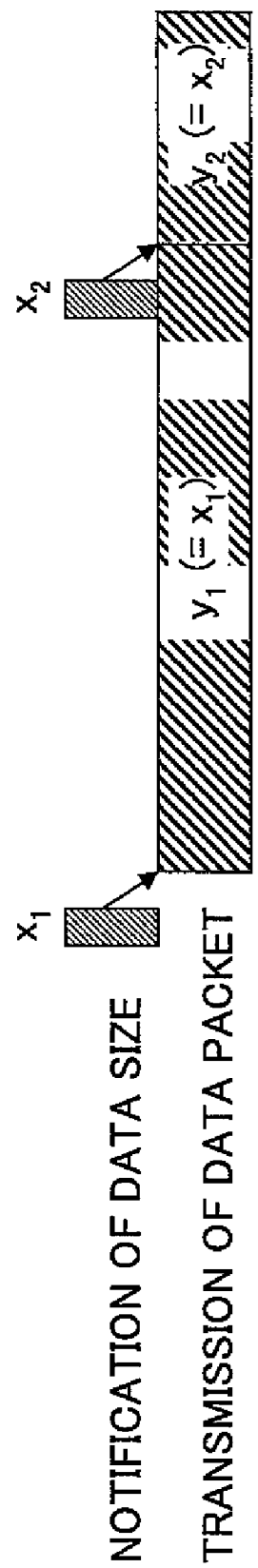
FIG. 2 shows a transmission period of a reservation control signal.

For example, in the event of transmitting data, the control signal transmission control unit 106 transmits the data size of transmission data ($x_1$, for example) as control information to the base station 200 in advance, and then transmits data upon receiving a grant of permission from the base station 200. Then, the control signal transmission control unit 106 transmits the next data size ($x_2$, for example) as control information, just before completing transmission of data with the data size $x_1$. For example, the mobile station 100 transmits data in the shaded areas shown in FIG. 2, upon receiving a transmission grant from the base station 200. In FIG. 2, $x_i$ represents a notified data size (i represents a positive integer), and $y_i$ represents a data size which is transmitted during a single reservation interval (a unit of reservation) (i represents a positive integer).

When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas (areas with white color) show the status where the transmission slot is allocated to the other mobile stations. The time intervals for both the shaded areas and the areas other than the shaded areas vary depending on a channel condition and/or scheduling by the base station 200. That is, an effective information rate varies depending on variable rate transmission and/or an allocation frequency.

The control signal transmission control unit 106 predetermines a threshold for the data size of transmission data. When the data size of transmission data becomes equal to the predetermined threshold, the control signal transmission control unit 106 provides notification of a next data size as control information. The threshold may be determined by the mobile station 100 in advance, or may be determined by the network side. In the case of the threshold determined by the network side, the threshold can be determined based on the status of the whole system, because conditions of data transmission by the other mobile stations are recognized.

Reducing the frequency of notification of the control signals in this manner can reduce overhead caused by the reservation control signals.

Figure 3:
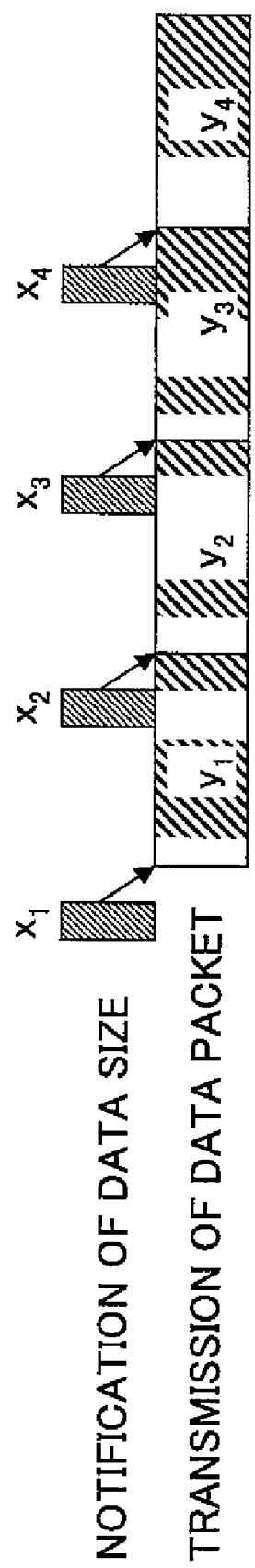
FIG. 3 shows a transmission period of a reservation control signal.

Alternatively, the control signal transmission control unit 106 may also provide notification of a next data size periodically, as shown in FIG. 3, for example. Again, the next data size is calculated from the data size in the buffer at the present time.

For example, in the event of transmitting data, the control signal transmission control unit 106 transmits the data size of transmission data ($x_1$, for example) as control information to the base station 200 in advance, and then transmits data upon receiving a grant from the base station. Then, the control signal transmission control unit 106 transmits the next data size ($x_2$, for example) as control information at a predetermined period. The time interval between transmitting the data size and transmitting the next data size is kept constant. For example, the mobile station 100 transmits data in the shaded areas shown in FIG. 3, upon receiving a transmission grant from the base station 200. In FIG. 3, $x_i$ represents a notified data size (i represents a positive integer), and $y_i$ represents a data size which is transmitted during a single reservation interval (i represents a positive integer).

When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations.

Transmitting control signals in this manner allows the base station to 200 recognize the current buffer status of the mobile station 100. Accordingly, the base station 200 can perform control based on the buffer status. That is, the base station 200 can perform scheduling. In addition, periodic notification facilitates the arrangement of a control channel. For example, the control channel can be arranged with a fixed length field attached to a data packet.

Figure 4:
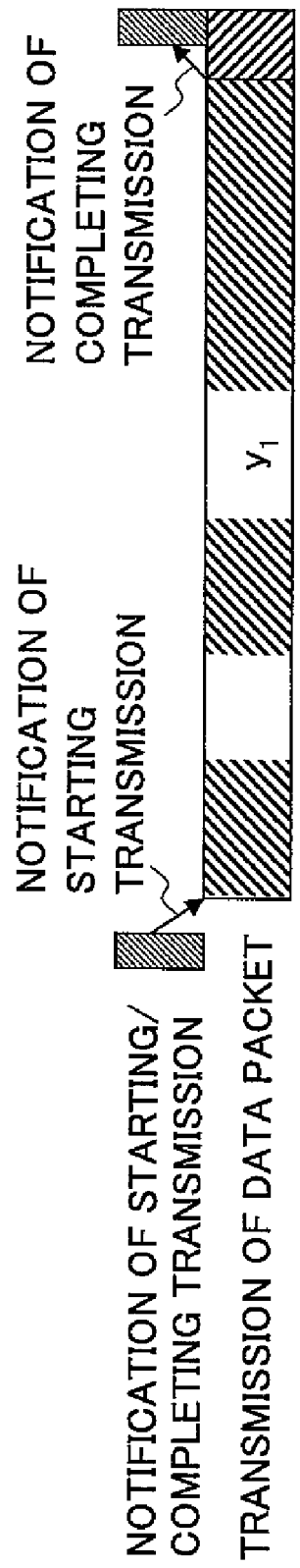
FIG. 4 shows a transmission period of a reservation control signal.

Alternatively, the control signal transmission control unit 106 may also provide notification of starting and completing data transmission, as shown in FIG. 4, for example. In this case, the mobile station 100 provides notification of a request for starting transmission at the time when data starts entering the buffer, and provides notification of completing transmission at the time when the buffer becomes empty. In this case, the time interval between starting transmission and completing transmission varies depending on a channel condition and/or scheduling. In FIG. 2, $y_i$ represents a data size of transmission data (i represents a positive integer).

When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations. The time intervals for both the shaded areas and the areas other than the shaded areas vary depending on a channel condition and/or scheduling by the base station 200. That is, an effective information rate varies depending on variable rate transmission and/or an allocation frequency.

Transmitting control signals in this manner can reduce overhead caused by the reservation control signals particularly when the total data size becomes longer, because the mobile station only needs to provide notification of starting transmission and completing transmission. In addition, the mobile station 100 does not have to provide notification of the data size. In the case of communications at a constant rate/the mobile station 100 can provide notification of an information rate by means of the reservation control signal, and then the base station can allocate slots according to the information rate (at a constant period, for example), which can reduce the frequency of notification of the reservation control signals. For example, in the case of voice communications, notification of the communication type by means of the reservation control signal allows the base station 200 to estimate the information rate for the voice communications, because the amount of data to be transmitted is known in advance.

Alternatively, the mobile station 100 may also provide notification that the data size in the buffer is more than or equal to a certain value (the data size is more than or equal to $x_1$, for example), and provide notification of the remaining data size when the data size in the buffer becomes less than $x_1$. In this case, both the time interval between starting transmission and completing transmission and the time when notification of the remaining data size is provided vary depending on a channel condition and/or scheduling.

For example, in the case of the large data size, the control signal transmission control unit 106 transmits control information to the base station 200 that the data size of transmission data is more than or equal to $x_1$, for example, and then transmits data upon receiving a grant from the base station 200. When the data size in the buffer becomes less than $x_1$, the control signal transmission control unit 106 transmits control information that the data size of transmission data is $x_1$. For example, the mobile station 100 transmits data in the shaded areas shown in FIG. 5A, upon receiving a transmission grant from the base station 200. In FIG. 5A, $x_1$ represents a threshold for the data size in the buffer, and $y_1$ represents a data size of transmission data.

When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations. The time intervals for both the shaded areas and the areas other than the shaded areas vary depending on a channel condition and/or scheduling by the base station 200. That is, an effective information rate varies depending on variable rate transmission and/or an allocation frequency.

Figure 5B:
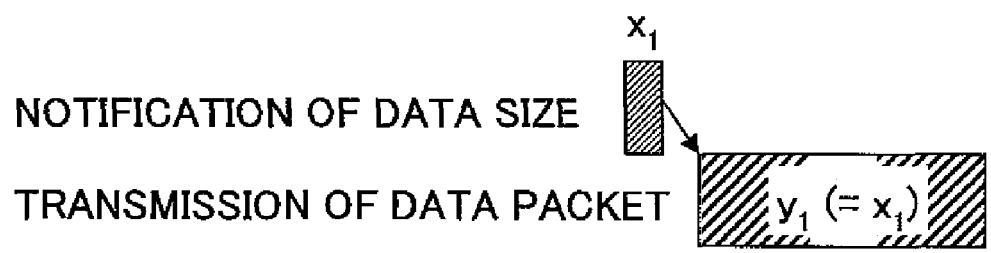
FIG. 5B shows a transmission period of a reservation control signal.

For example, in the case of the small data size, the control signal transmission control unit 106 transmits control information to the base station 200 that the data size of transmission data is less than $x_1$, for example, and then transmits data upon receiving a grant from the base station 200. For example, the mobile station 100 transmits data in the shaded areas shown in FIG. 5B, upon receiving a transmission grant from the base station 200. In FIG. 5B, $x_1$ represents a threshold for the data size in the buffer, and $y_1$ represents a data size of transmission data (i.e. $y_1$ equals to $x_1$).

When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations. The time intervals for both the shaded areas and the areas other than the shaded areas vary depending on a channel condition and/or scheduling by the base station 200. That is, an effective information rate varies depending on variable rate transmission and/or an allocation frequency.

Transmitting control signals in this manner can reduce the frequency of notification, thereby reducing overhead caused by the reservation control signals, because the mobile station only needs to provide notification of starting transmission and completing transmission during a unit of transmission for a large data size.

With reference to FIG. 6, a description is given below with regard to an operation of the mobile station 100 in accordance with the present embodiment. In the present embodiment, the mobile station 100 selects based on traffic to be transmitted, as a transmission period of a reservation control signal, either providing notification of next data size just before completing transmission of data with the data size previously notified (or reserved), or providing notification of a next data size periodically. The other cases for the other transmission periods as described above benefit from the same effect of the present embodiment, by selecting based on traffic.

First, a request for data transmission is generated (Step S602).

Then, the traffic type determination unit 102 determines whether data requested for data transmission is Real-Time traffic or Non-Real-Time traffic (Step S604).

In the case of Non-Real-Time traffic (Step S604: NRT traffic), the mobile station 100 transmits a reservation control signal at a transmission period of providing notification of a next data size just before completing transmission of data with the data size previously notified (or reserved) (Step S606). For Non-Real-Time traffic, the data size of transmission data varies with the time. Thus, providing notification as required can reduce overhead caused by the reservation control signals.

In the case of Real-Time traffic (Step S604: RT traffic), the mobile station 100 transmits a reservation control signal indicating a next data size periodically (Step S608). For Real-Time traffic, the data size of transmission data (information rate) is constant. Thus, providing notification only for the first time (and not providing notification afterward) can reduce overhead caused by the reservation control signals.

Next, a description is given below with regard to a mobile communication system in accordance with a second embodiment of the present invention.

Although the mobile station provides notification of a data size, etc., in the first embodiment described above, the base station may prevent the mobile station 100 from transmitting the reservation control signal, or provide notification of the transmission period of the reservation control signal. In this case, the base station 200 determines whether a reservation can be accepted based on a traffic condition on radio channels. Based on the result of the determination, the base station provides notification of a transmission grant/prevention for the reservation control signal on a downlink control channel. Transmitting control signals in this manner allows the base station 200 to prevent the mobile station 100 from transmitting the reservation control signals, in the event of traffic congestion on radio channels.

Figure 7:
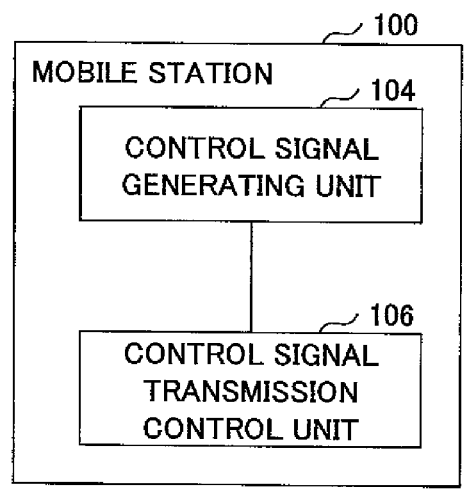
FIG. 7 shows a block diagram of a mobile station in accordance with an embodiment of the present invention.

With reference to FIG. 7, a description is given below with regard to a mobile station 100 in accordance with the second embodiment.

The mobile station 100 in accordance with the second embodiment includes a control signal generating unit 104 and a control signal transmission control unit 106 connected to the control signal generating unit 104. The mobile station 100 shown in FIG. 7 corresponds to the mobile station 100 shown in FIG. 1 with an omission of the traffic type determination unit 102. The operations in the control signal generating unit 104 and the control signal transmission control unit 106 are generally the same as those in the control generating unit 104 and the control signal transmission control unit 106 as described with reference to FIG. 1, except that a transmission period of a reservation control signal is controlled in the control signal transmission control unit 106 based on control information received on a downlink control channel from the base station 200.

Figure 8:
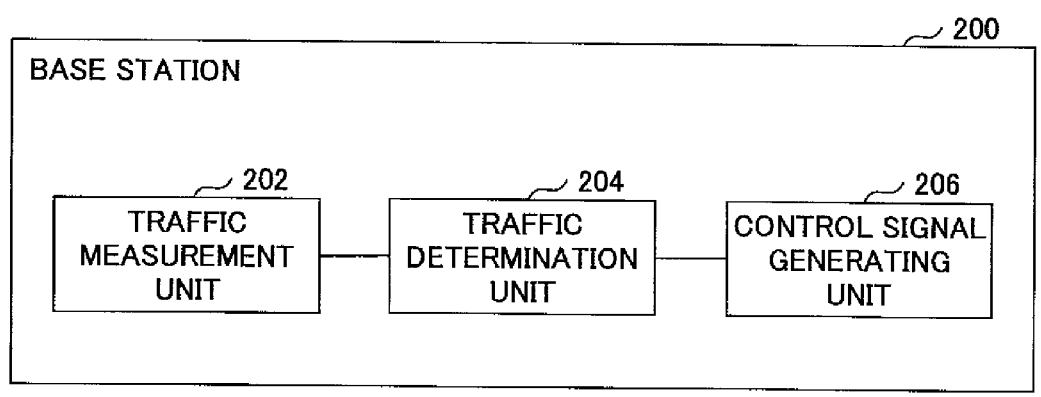
FIG. 8 shows a block diagram of a base station in accordance with an embodiment of the present invention.

With reference to FIG. 8, a description is given below with regard to a base station 200 in accordance with the second embodiment.

The base station 200 includes a traffic measurement unit 202, a measurement determination unit 204 connected to the traffic measurement unit 202, and a control signal generating unit 206 connected to the traffic determination unit 204.

The traffic measurement unit 202 measures traffic on an uplink channel from the mobile station 100 to the base station 200.

The traffic determination unit 204 determines whether the base station can accept a reservation for uplink transmission from the mobile station 100, based on the traffic condition on the uplink channel measured by the traffic measurement unit 202. For example, the traffic determination unit 204 predetermines a threshold for traffic on the uplink radio channel and determines whether the base station can accept the reservation-based on the threshold.

The traffic determination unit 204 also determines an optimum transmission period of the reservation control signal, based on the traffic condition measured by the traffic measurement unit 202. For example, the traffic determination unit 204 predetermines a threshold for traffic on the uplink channel and determines the optimum transmission period of the reservation control signal based on the threshold.

The control signal generating unit 206 generates a control signal for providing notification of a transmission grant/prevention for the reservation control signal based on the determination by the traffic determination unit 204 of whether the base station 200 can accept the reservation, and then transmits the control signal to the mobile station 100. The control signal generating unit 206 also generates a control signal indicating the optimum transmission period of the reservation control signal determined by the traffic determination unit 204, and then transmits the control signal to the mobile station 100.

Consequently, the mobile station 100 transmits the reservation control signal when the transmission grant for the reservation control signal is received.

For example, in the event of transmitting data, when the transmission grant for the reservation control signal is received, the control signal transmission control unit 106 transmits the data size of transmission data ($x_1$, for example) as control information to the base station 200 in advance, and then transmits data upon receiving a grant from the base station 200. When the transmission prevention for the reservation control signal is received, the control signal transmission control unit 106 does not transmit a next data size ($x_2$, for example) as next control information. When the transmission grant for the reservation control signal is received once again, the control signal transmission control unit 106 transmits the next data size ($x_2$, for example) as control information.

Figure 9:
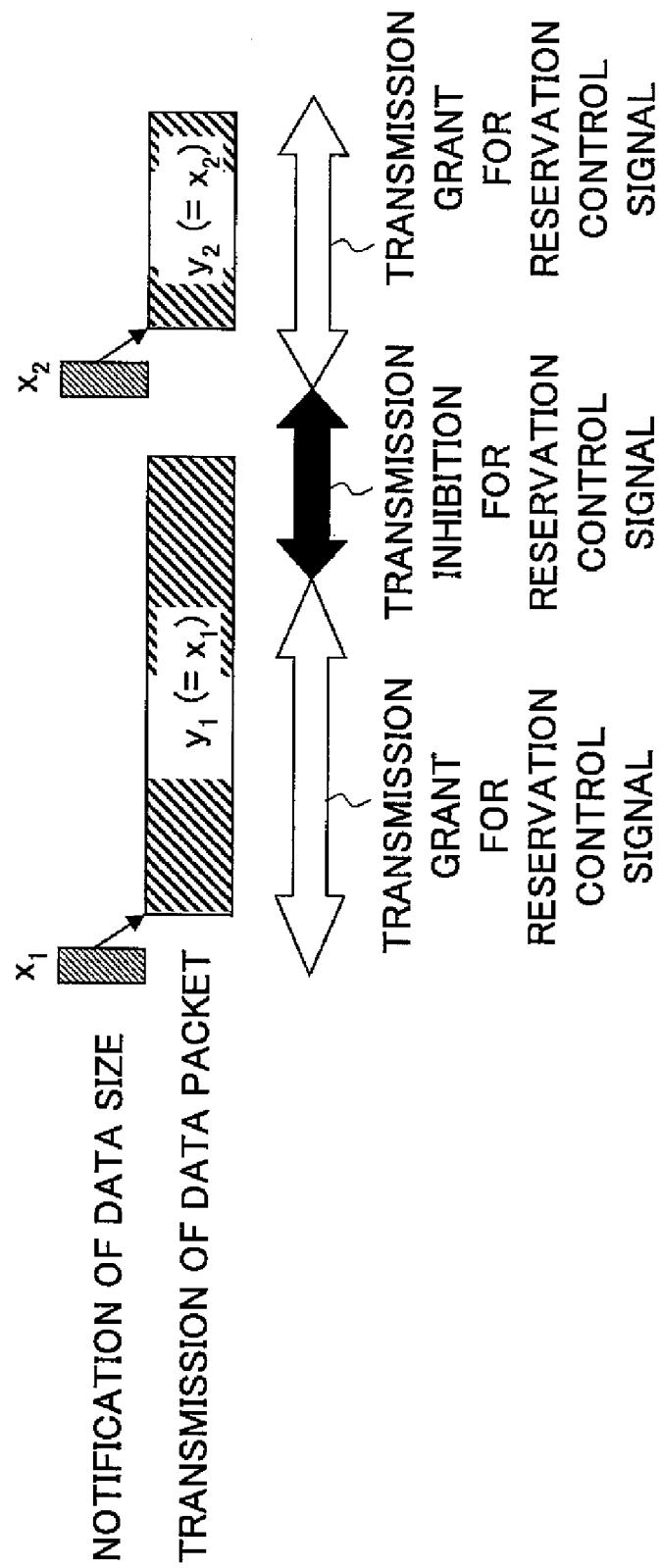
FIG. 9 shows a transmission period of a reservation control signal.

For example, the mobile station 100 transmits data in the shaded areas shown in FIG. 9, upon receiving a transmission grant from the base station 200. In FIG. 9, $x_i$ represents a notified data size (i represents a positive integer), and $y_i$ represents a data size which is transmitted during a single reservation interval (i represents a positive integer).

When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations. The time intervals for both the shaded areas and the areas other than the shaded areas vary depending on a channel condition and/or scheduling by the base station 200. That is, an effective information rate varies depending on variable rate transmission and/or an allocation frequency.

With reference to FIGS. 10A and 10B, a description is given below with regard to operations of the mobile communication system in accordance with the present embodiment. In the present embodiment, the base station 200 selects based on the traffic condition, as a transmission period of a reservation control signal, either providing notification of a next data size just before completing transmission of data with the data size previously notified (or reserved) (hereinafter referred to as Transmission Period 1), or providing notification of a next data size periodically (hereinafter referred to as Transmission Period 2). The other cases for the other transmission periods as described above benefit from the same effect of the present embodiment, by selecting based on the traffic condition on radio channels.

With reference to FIG. 10A, a description is given below with regard to an operation of the base station 200.

First, the traffic measurement unit 202 measures uplink traffic (Step S1002).

Then, the traffic determination unit 204 determines whether the measured value of uplink traffic is more than a predetermined threshold (i.e. the measured value of uplink traffic>the predetermined threshold?) (Step S1004).

If the measured value of uplink traffic is more than the predetermined threshold (i.e. the measured value of uplink traffic>the predetermined threshold) (Step S1004:YES), then the control signal generating unit 206 generates a control signal which instructs the mobile station 100 to transmit a reservation control signal at a transmission period of providing notification of a next data size just before completing transmission of data with the data size previously notified (or reserved) (Transmission Period 1), and transmits the control signal on a downlink control channel (Step S1006). Transmitting control signals in this manner allows the base station 200 to inhibit control signals in the case of much uplink traffic.

If the measured value of uplink traffic is less than or equal to the predetermined threshold (i.e. the measured value of uplink traffic=<the predetermined threshold) (Step S1004: NO), the control signal generating unit 206 generates a control signal which instructs the mobile station 100 to transmit a reservation control signal indicating a next data size periodically (Transmission Period 2), and transmits the control signal on the downlink control channel (Step S1008). Transmitting control signals in this manner allows the base station 200 to recognize the current status of the mobile station 100 in the case of little traffic.

With reference to FIG. 10B, a description is given below with regard to an operation of the mobile station 100.

First, a request for data transmission is generated (Step S1010).

Then, the control signal transmission control unit 106 determines whether the base station 200 instructs the use of Transmission Period 1 (Step S1012).

If the base station 200 instructs the use of Transmission Period 1 (Step S1012: YES), the control signal transmission unit 106 transmits a reservation control signal at Transmission Period 1 (i.e. at a transmission period of providing notification of a next data size just before completing transmission of data with the data size previously notified (or reserved)). Transmitting control signals in this manner can reduce overhead caused by the reservation control signals in the case of much traffic.

If the base station 200 does not instruct the use of Transmission Period 1 (Step S1012: NO), the control signal transmission unit 106 transmits a reservation control signal indicating a next data size at Transmission Period 2 (i.e. periodically). Transmitting control signals in this manner allows the mobile station 100 to provide notification of the current status (changes of the buffer, for example) in the case of little traffic (i.e. in the case where there is room for traffic).

Next, a description is given below with regard to a mobile station 100 in accordance with a third embodiment of the present invention.

The mobile station 100 in accordance with the third embodiment is generally the same as the mobile station as described with reference to FIG. 1, except that the mobile station 100 transmits, as control information, (2) a request for QoS. That is, the control signal generating unit 104 generates QoS desired by the mobile station 100 (information about an error rate or information about delay, for example).

The control signal transmission control unit 106 also transmits a reservation control signal at every reservation interval (i.e. at the same timing for data size). Although data is transmitted based on a transmission interval (a unit of transmission) including one or more reservation intervals, it is assumed that a request for QoS remains constant throughout the reservation interval.

For example, in the event of transmitting data, the control signal transmission control unit 106 transmits the data size of transmission data ($x_1$, for example) and a request for QoS $Q_1$ as control information to the base station 200 in advance, and then transmits data upon receiving a grant from the base station 200. The control signal transmission control unit 106 transmits the next data size ($x_2$, for example) and a request for QoS $Q_2$ as control information, following data transmission with the data size corresponding to the reservation interval. In this case, the requests for QoS $Q_1$ and $Q_2$ transmitted along with the data sizes $x_1$ and $x_2$ may be either identical with or different from each other.

For example, the mobile station 100 transmits data in the shaded areas shown in FIG. 11, upon receiving a transmission grant from the base station 200. In FIG. 11, $x_i$ represents a notified data size (i represents a positive integer). When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations. The time intervals for both the shaded areas and the areas other than the shaded areas vary depending on a channel condition and/or scheduling by the base station 200. That is, an effective information rate varies depending on variable rate transmission and/or an allocation frequency.

Transmitting the request for QoS along with the data size facilitates transmission control, and supports variations in the request for QoS from reservation interval to reservation interval.

Alternatively, the control signal generating unit 104 may provide notification of the request for QoS at every transmission interval including one or more reservation intervals, as shown in FIG. 12, for example. For example, the control signal generating unit 104 may provide notification at the time of the initial reservation (i.e. at the initial transmission interval). In this case, the mobile station 100 transmits a request for QoS, when data to be transmitted is generated or when the buffer status changes.

For example, in the event of transmitting data, the control signal transmission control unit 106 transmits the data size of transmission data ($x_1$, for example) and a request for QoS Q as control information to the base station 200 in advance, and then transmits data upon receiving a grant from the base station 200. In the event of transmitting the data size of the following transmission data, the control signal transmission control unit 106 transmits the next data size ($x_2$, for example) without the request for QoS as control information.

For example, the mobile station 100 transmits data in the shaded areas shown in FIG. 12, upon receiving a transmission grant from the base station 200. In FIG. 12, $x_i$ represents a notified data size (i represents a positive integer).

When the reservation for the data size is accepted by the base station 200, the mobile station 100 is under the control of the base station 200. However, the base station does not always allocate a transmission slot to this mobile station. The shaded areas show the status where the transmission slot is allocated to this mobile station, and the areas other than the shaded areas show the status where the transmission slot is allocated to the other mobile stations. The time intervals for both the shaded areas and the areas other than the shaded areas vary depending on a channel condition and/or scheduling by the base station 200. That is, an effective information rate varies depending on variable rate transmission and/or an allocation frequency. Transmitting control signals in this manner can reduce overhead caused by the reservation control signals.

Alternatively, the request for QoS may be notified prior to the reservation control (i.e. in the call control procedure or the call control sequence).

Figure 13:
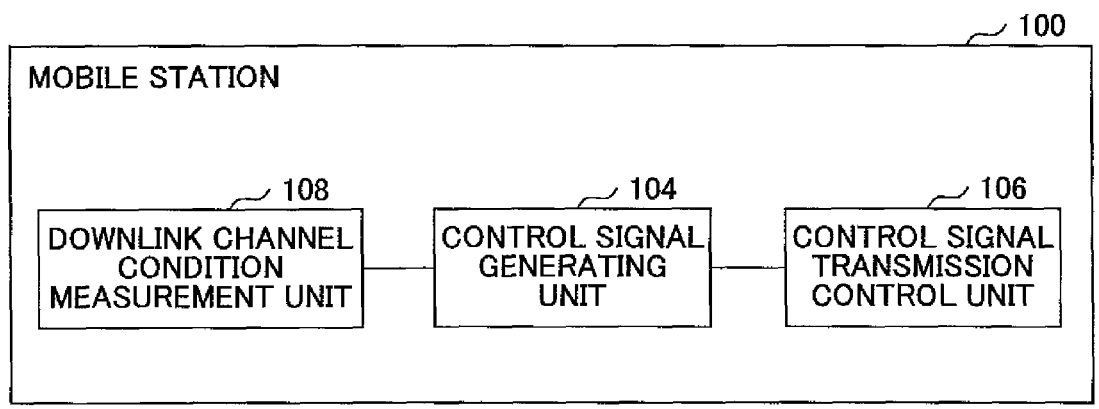
FIG. 13 shows a block diagram of a mobile station in accordance with an embodiment of the present invention.

With reference to FIG. 13, a description is given below with regard to a mobile station in accordance with a fourth embodiment of the present invention. The mobile station 100 in accordance with the fourth embodiment transmits, as control information, (3) a downlink channel condition or transmission power of the mobile station 100.

The mobile station 100 includes a downlink channel measurement unit 108, a control signal generating unit 104 connected to the downlink channel condition measurement unit 108, and a control signal transmission control unit 106 connected to the control signal generating unit 104.

The downlink channel condition measurement unit 108 measures an average channel condition such as a path-loss, the maximum Doppler frequency ($f_D$), and a delay spread, by means of a downlink common pilot channel (CPICH). For example, the downlink channel condition measurement unit 108 measures the received level of the common pilot channel and determines path-loss based on the measured value and transmission power transmitted as control information from the base station 200. Although the average channel condition can be also measured by the base station 200, measurement by the mobile station 100 by means of the common pilot channel can improve the measurement accuracy.

The downlink channel condition measurement unit 108 also measures average channel conditions for the other cells such as pass-losses for the other cells. The downlink channel condition measurement unit 108 also measures transmission power such as absolute transmission power and a margin up to the maximum transmission power.

The control signal generating unit 104 generates a control signal based on the measured downlink channel condition and the transmission power of the mobile station 100.

The control signal transmission control unit 106 transmits the control signal generated by the control signal generating unit 104. For example, the control signal transmission control unit 106 provides notification of at least one of the downlink channel condition and the transmission power of the mobile station 100 periodically (every 100 ms, for example), as shown in FIG. 14.

For example, in the event of transmitting data, the control signal transmission control unit 106 transmits the data size of transmission data ($x_1$, for example), a request for QoS $Q_1$, and a downlink channel condition $CH_1$ as control information to the base station 200 in advance, and then transmits data upon receiving a grant from the base station 200. The control signal transmission control unit 106 also transmits a downlink channel condition $CH_2$ as control information periodically (every 100 ms, for example).

Figure 14:
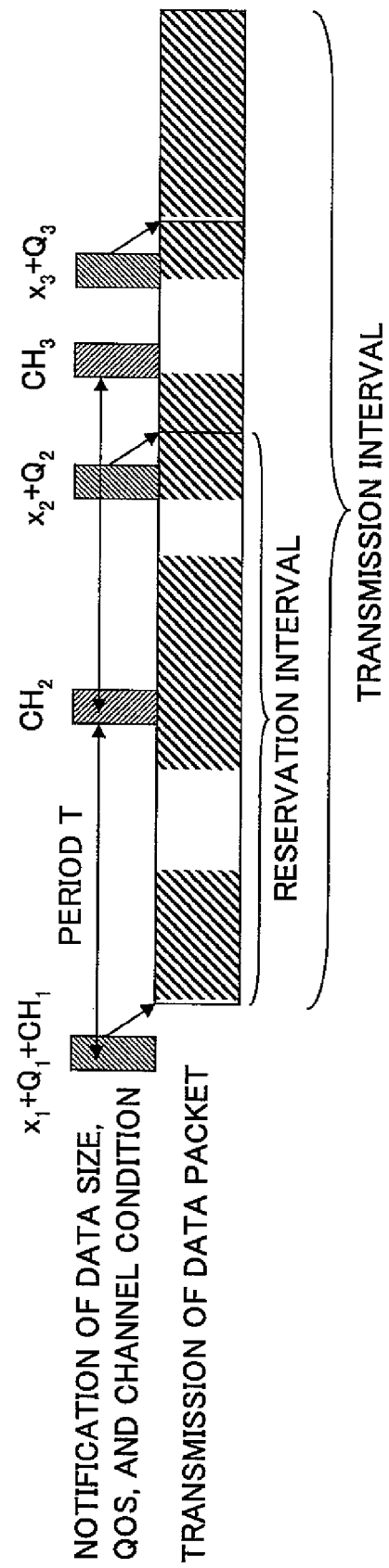
FIG. 14 shows a transmission period of a reservation control signal.

For example, the mobile station 100 transmits data in the shaded areas shown in FIG. 14, upon receiving a transmission grant from the base station 200. In FIG. 14, $x_i$ represents a notified data size (i represents a positive integer). When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations.

Transmitting control signals in this manner facilitates transmission control compared to the variable transmission period, because the base station 200 can estimate the reception timing of the downlink channel conditions. In addition, shortening the transmission period improves the tracking performance for the fluctuation of the channel condition.

Figure 15:
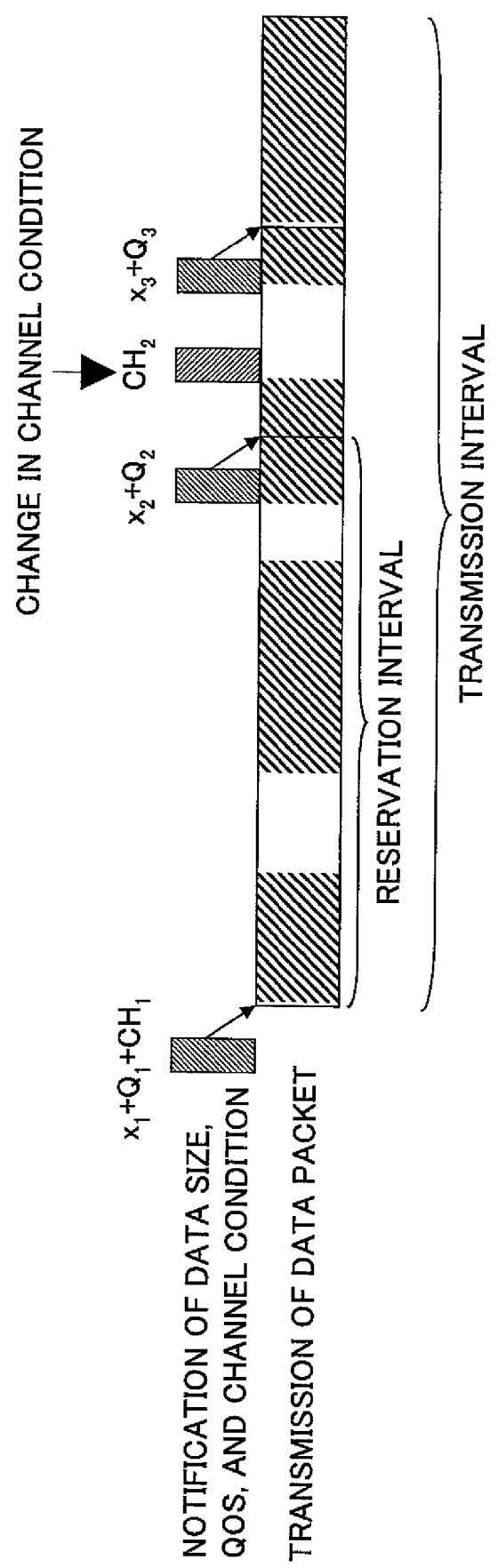
FIG. 15 shows a transmission period of a reservation control signal.

Alternatively, the control signal transmission control unit 106 may provide notification of the channel condition when the channel condition changes, as shown in FIG. 15, for example.

For example, in the event of transmitting data, the control signal transmission control unit 106 transmits the data size of transmission data ($x_1$, for example), a request for QoS $Q_1$, and a downlink channel condition $CH_1$ as control information to the base station 200 in advance, and then transmits data upon receiving a grant from the base station 200. The control signal transmission control unit 106 transmits a downlink channel condition $CH_2$ when the channel condition changes. For example, the control signal transmission control unit 106 predetermines a threshold for the change in the channel condition, and provides notification when the channel condition falls below the threshold. In this case, the data size and the request for QoS are transmitted at a predetermined period.

For example, the mobile station 100 transmits data in the shaded areas shown in FIG. 15, upon receiving a transmission grant from the base station. In FIG. 15, $x_i$ represents a notified data size (i represents a positive integer). When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations.

Transmitting control signals in this manner can reduce overhead caused by the reservation control signals, because the frequency of notification of the downlink channel conditions can be kept to the minimum necessity. In addition, this improves the tracking performance for the fluctuation of the channel condition.

Figure 16:
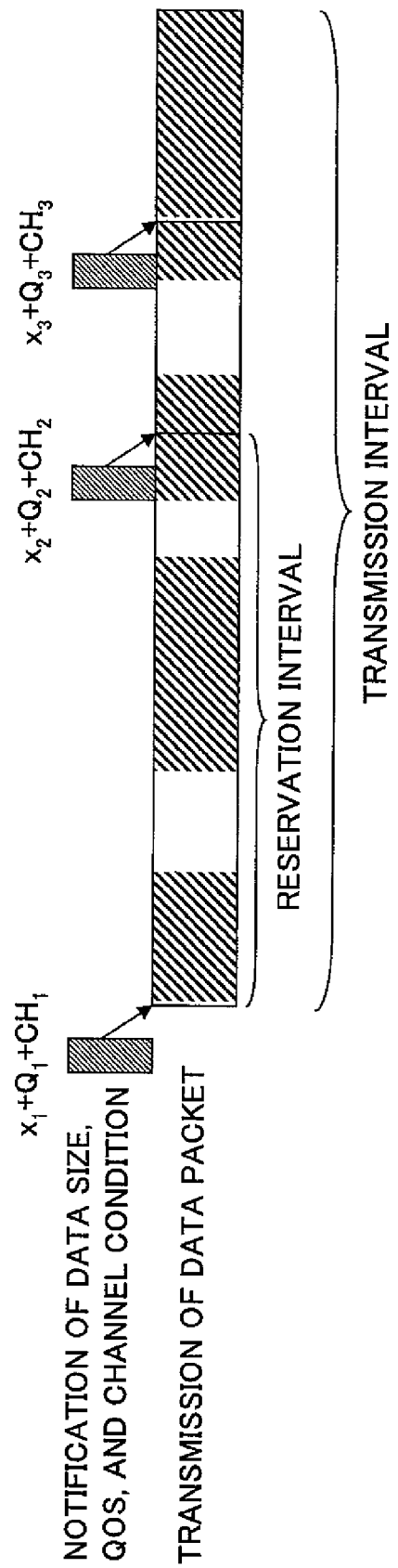
FIG. 16 shows a transmission period of a reservation control signal.

Alternatively, the control signal transmission control unit 106 may provide notification of the channel condition at each of one or more reservation intervals included in a transmission interval, as shown in FIG. 16, for example.

For example, in the event of transmitting data, the control signal transmission control unit 106 transmits the data size of transmission data ($x_1$, for example), a request for QoS $Q_1$, and a downlink channel condition $CH_1$ as control information to the base station 200 in advance, and then transmits data upon receiving a grant from the base station 200. In the event of transmitting the data size of the next transmission data, the control signal transmission control unit 106 transmits the data size ($x_2$, for example), a request for QoS $Q_2$, and a downlink channel condition $CH_2$ as control information to the base station 200.

For example, the mobile station 100 transmits data in the shaded areas shown in FIG. 16, upon receiving a transmission grant from the base station. When the reservation for the data size is accepted by the base station 200, the mobile station 100 is under the control of the base station 200. However, the base station does not always allocate a transmission slot to this mobile station 100. The shaded areas show the status where the transmission slot is allocated to this mobile station, and the areas other than the shaded areas show the status where the transmission slot is allocated to the other mobile stations.

Transmitting at least one of the downlink channel condition and the transmission power of the mobile station along with the data size further improves efficiency and facilitates transmission control.

Figure 17:
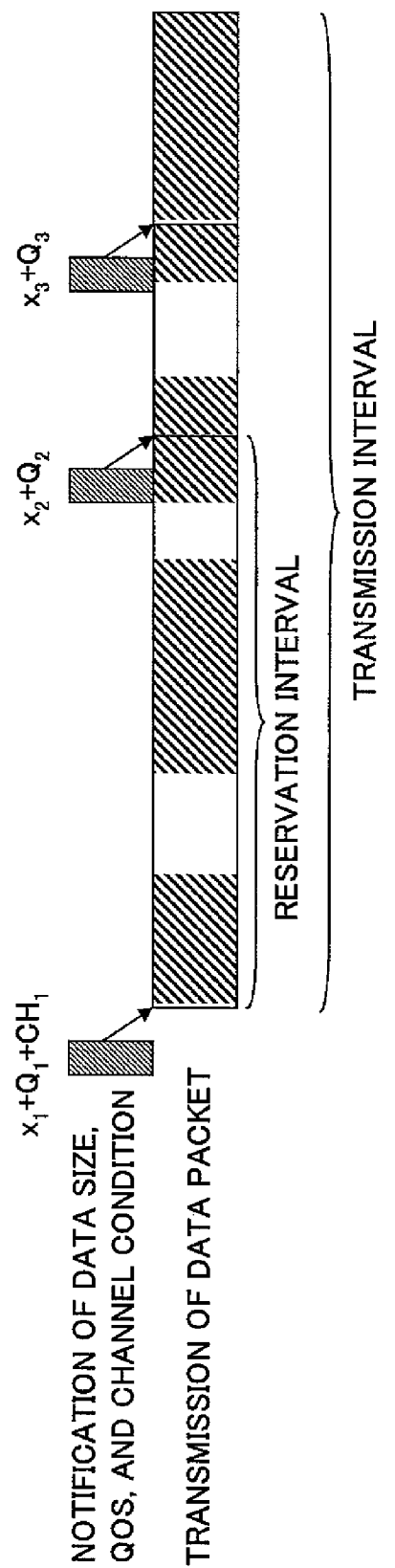
FIG. 17 shows a transmission period of a reservation control signal.

Alternatively, the control signal transmission control unit 106 may provide notification of the channel condition at every transmission interval, as shown in FIG. 17, for example. For example, the control signal transmission control unit 106 provides notification at the time of the initial reservation.

For example, in the event of transmitting data, the control signal transmission control unit 106 transmits the data size of transmission data ($x_1$, for example) and a request for QOS $Q_1$ as control information to the base station 200 in advance, and then transmits data upon receiving a grant from the base station 200.

Then, the control signal transmission control unit 106 provides notification of the downlink channel condition at every transmission interval including one or more reservation intervals. In other words, the control signal transmission control unit 106 does not provide notification at every reservation interval.

For example, the mobile station 100 transmits data in the shaded areas shown in FIG. 17, upon receiving a transmission grant from the base station 200. When the reservation for the data size is accepted by the base station 200, the mobile station 100 is under the control of the base station 200. However, the base station does not always allocate a transmission slot to this mobile station. The shaded areas show the status where the transmission slot is allocated to this mobile station, and the areas other than the shaded areas show the status where the transmission slot is allocated to the other mobile stations.

Transmitting control signals in this manner can reduce overhead caused by the reservation control signals, because the frequency of notification of the downlink channel conditions can be reduced.

Figure 18:
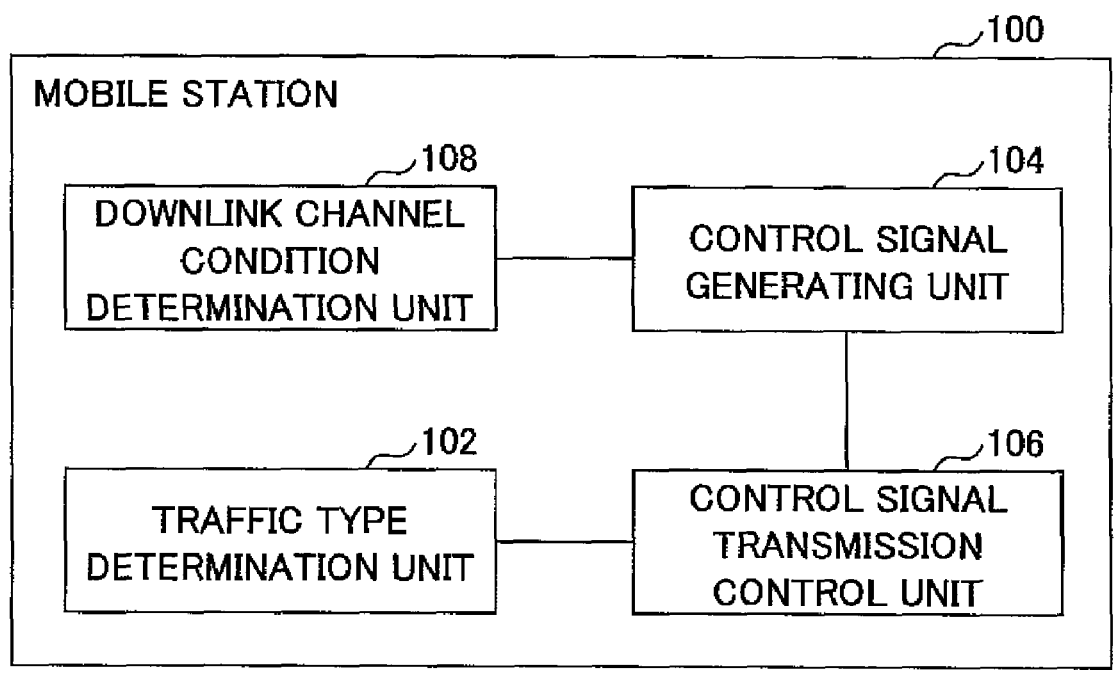
FIG. 18 shows a block diagram of a mobile station in accordance with an embodiment of the present invention.

With reference to FIG. 18, a description is given below with regard to a mobile station 100 in accordance with a fifth embodiment of the present invention. The mobile station 100 in accordance with the fifth embodiment includes the features of the mobile station 100 in accordance with the aforementioned embodiments.

The mobile station 100 includes a traffic type determination unit 102, a downlink channel condition measurement unit 108, a control signal generating unit 104 connected to the downlink channel condition measurement unit 108, and a control signal transmission control unit 106 connected to both the traffic type determination unit 102 and the control signal generating unit 104.

The operations performed in each unit are the same as those in the aforementioned embodiments, thus omitted.

Figure 19:
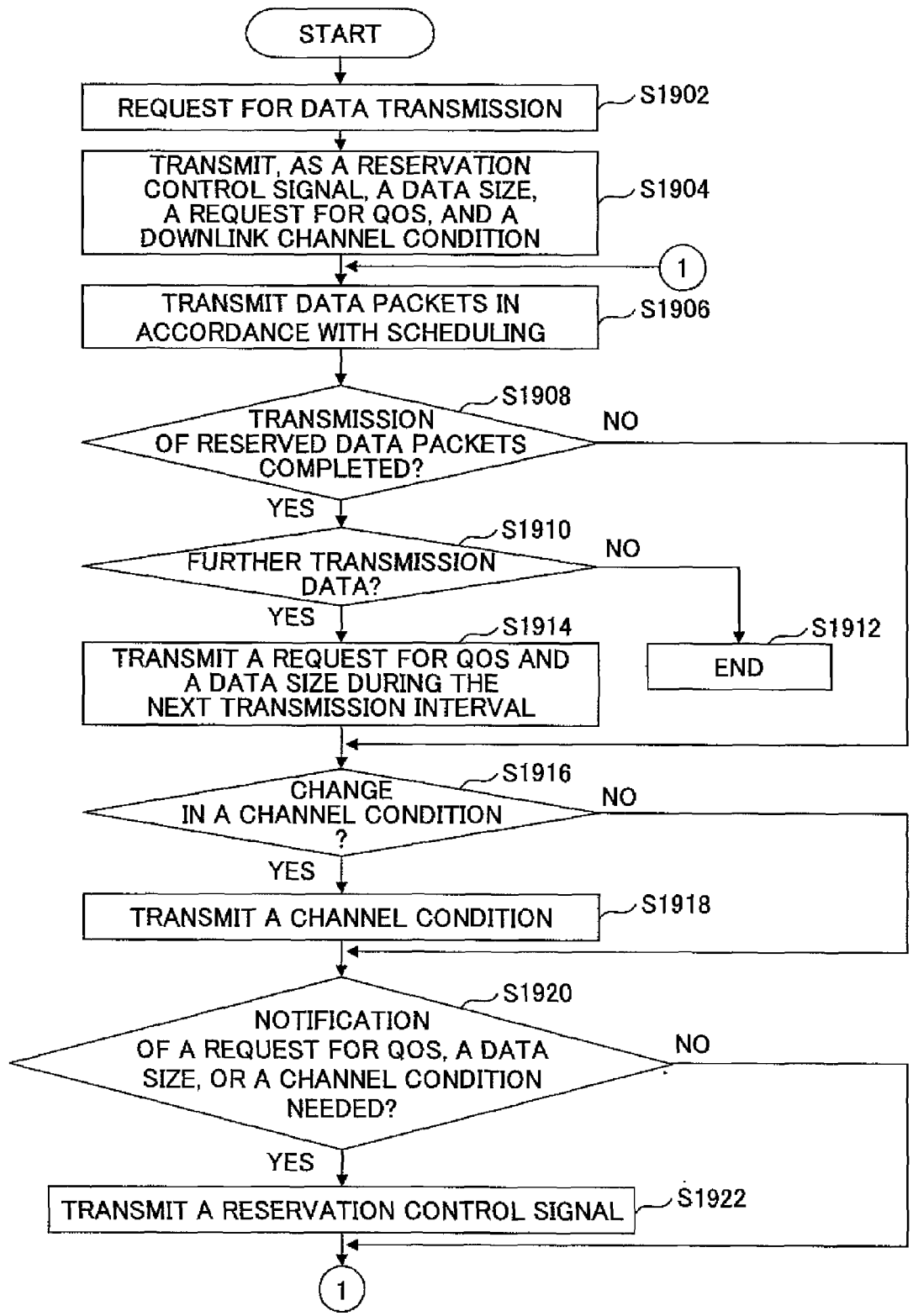
FIG. 19 shows a flowchart illustrating an operation of a mobile station in accordance with an embodiment of the present invention.

With reference to FIG. 19, a description is given below with regard to an operation of the mobile station 100 in accordance with the present embodiment. In the present embodiment, the mobile station 100 provides notification of a next data size just before completing transmission of data with the data size previously notified (or reserved), and provides notification of at least one of a downlink channel condition and transmission power when the channel condition changes.

First, a request for data transmission is generated (Step S1902).

Then, the mobile station 100 transmits, as a reservation control signal, a data size, a request for QoS, and at least one of a downlink channel condition and transmission power (Step S1904).

Then, the mobile station 100 transmits data packets in accordance with scheduling by the base station 200 (Step S1906). Then, the mobile station 100 determines whether transmission of the reserved data packets is completed (Step S1908). If transmission of the reserved data packets is not completed (Step S1908: NO), the process continues to Step S1916 as described below. Otherwise, if transmission of the reserved data packets is completed (Step S1908: YES), the mobile station 100 determines whether there remains further data to be transmitted (Step S1910).

If there remains further data to be transmitted (Step S1910: YES), the mobile station 100 provides notification of a request for QoS and a data size for the next transmission interval (Step S1914). Otherwise (Step S1910: NO), the process comes to an end.

Then, the mobile station 100 determines whether the channel condition changes (Step S1916). If the channel condition does not change (Step S1916: NO), the process continues to Step S1920 as described below. Otherwise, if the channel condition changes (Step S1916: YES), the mobile 100 station provides notification of the channel condition (Step S1918). Then, the mobile station determines whether at least one of a request for QoS, a data size, and a channel condition is needed (Step S1920). If at least one of a request for QoS, a data size, and a channel condition is needed (Step S1920: YES), the mobile station 100 transmits a reservation control signal (Step S1922), and then returns to Step S1906. Otherwise, if none of a request for QoS, a data size, and a channel condition is needed (Step S1920: NO), the process returns to Step S1906.

Next, a description is given below with regard to a transmission channel for the reservation control signals in the aforementioned embodiment.

Control channels include a reservation control channel, a dedicated control channel, and an upper-layer control signal.

The reservation control channel is a contention-based common channel, and thus has a possibility of collisions. However, the reservation control channel is effective in terms of code resources and hardware resources in the base station. The dedicated control channel is a channel which is allocated to an individual user. Although the dedicated control channel is ineffective in terms of code resources and hardware resources in the base station 200, it has higher reliability without collisions. The upper-layer control signal is transmitted as data packets in terms of the physical layer.

Figure 20:
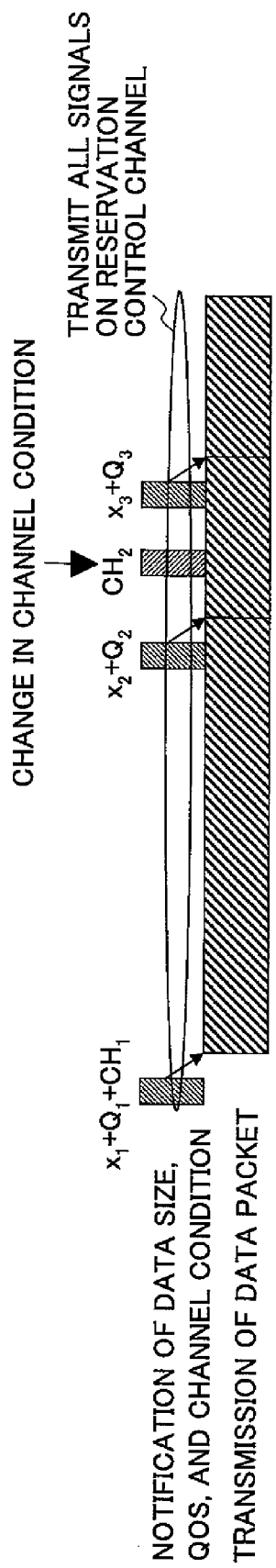
FIG. 20 shows a transmission channel of a reservation control signal.

For example, the control signal transmission control unit 106 transmits all of the reservation control signals (i.e. a data size, a request for QoS, and a channel condition), which are generated by the control signal generating unit 104, on the reservation control channel, as shown in FIG. 20. Transmitting control signals in this manner facilitates transmission control, and also improves efficiency because of common use of code resources and hardware resources in the base station 200.

Figure 21:
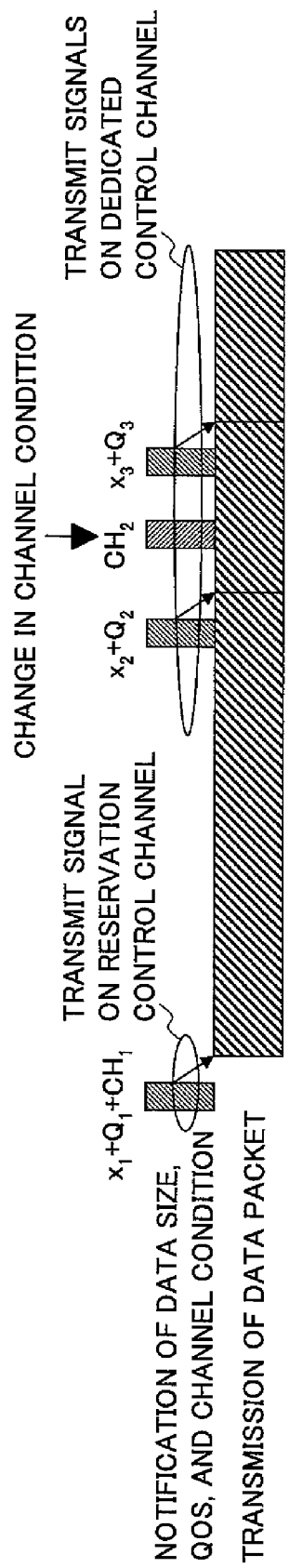
FIG. 21 shows a transmission channel of a reservation control signal.

Alternatively, the control signal transmission control unit 106 may first transmit the reservation control signal on the reservation control channel, and subsequently transmit the reservation control signals on the dedicated control channel until the completion of transmission, as shown in FIG. 21. Transmitting control signals in this manner allows for reliable transmission of the reserved data, because transmission of the dedicated control channel is more reliable than that of the contention based channel.

Alternatively, the control signal transmission control unit 106 may transmit all of the reservation control signals on the dedicated control channel. Transmitting control signals in this manner allows for reliable transmission, compared to the contention based channel.

Figure 22:
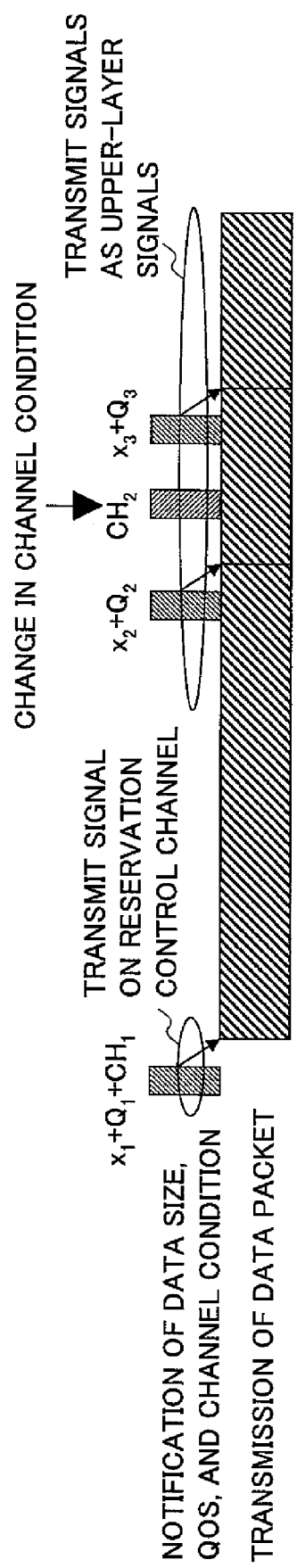
FIG. 22 shows a transmission channel of a reservation control signal.

Alternatively, the control signal transmission control unit 106 may first transmit the reservation control signal on the reservation control channel, and subsequently transmit the reservation control signals as the upper-layer signals until the completion of transmission, as shown in FIG. 22. Preferably, the dedicated control channel is transmitted at a constant rate. In other words, it is preferable to fix the control information field. Transmitting the reservation control signals as the upper-layer signals by means of data packets has the same effect as transmitting them on the dedicated control channel, while keeping the dedicated control channel at a constant information rate.

Figure 23:
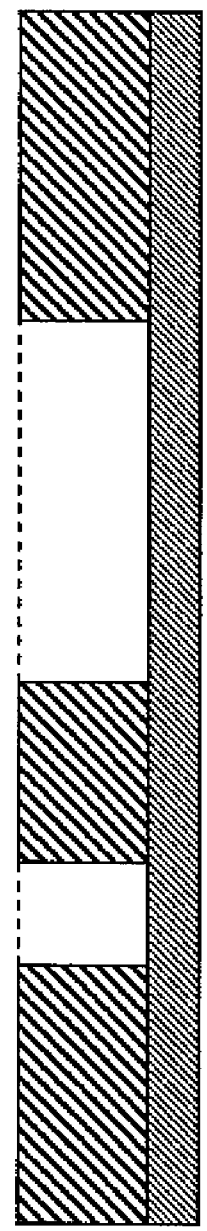
FIG. 23 shows a transmission period of an uplink pilot channel.
Figure 24:
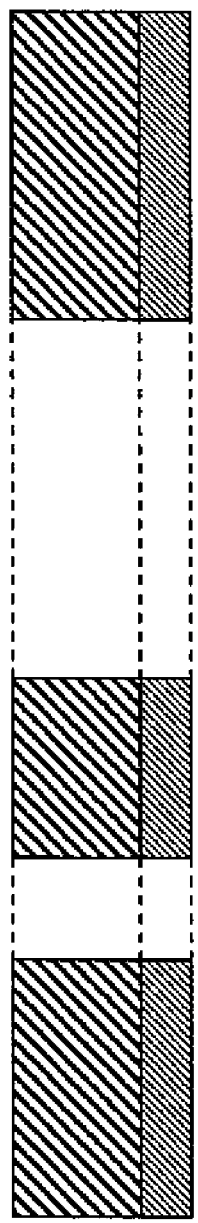
FIG. 24 shows a transmission period of an uplink pilot channel.
Figure 25:
FIG. 25 shows a transmission period of an uplink pilot channel.

With reference to FIGS. 23-25, a description is given below with regard to a transmission period of an uplink pilot channel.

The mobile station 100 transmits an uplink pilot channel, regardless of transmitting the reservation control signals or transmitting data.

The base station can 200 measure an uplink channel condition such as SIR, S, $f_D$, and the number of paths.

The mobile station 100 transmits the uplink pilot channel continuously, regardless of data transmission, as shown in FIG. 23. This improves the tracking performance for the instantaneous change in the channel condition, because the base station 200 can measure the channel condition at any time. Consequently, the base station 200 can allocate channels based on the instantaneous change in the channel condition.

Alternatively, the mobile station 100 may transmit the uplink pilot channel only during data transmission, as shown in FIG. 24. Transmitting control signals in this manner can reduce overhead.

Alternatively, the mobile station 100 may transmit the pilot channel before and during data transmission, as shown in FIG. 25. Transmitting control signals in this manner allows for use in Closed Loop TPC.

AVAILABILITY TO INDUSTRY

A mobile station, a base station, a mobile communication system, and a communication control method of the present invention are applicable to communication systems by means of uplink reservation-based packet access.

The present application is based on Japanese Priority Application No. 2005-116109 filed on Apr. 13, 2005 with the Japanese Patent Office, the entire contents of which are hereby incorporated by reference.

What is claimed is:

1. A mobile station performing packet communications with a base station, comprising:
  a reservation control signal generating unit configured to generate a reservation control signal for requesting an allocation of a transmission slot, based on control information transmitted in advance of a data packet;
  a reservation control signal transmission control unit configured to transmit to the base station the reservation control signal generated by the reservation control signal generating unit; and
  a data transmission unit configured to transmit data to the base station using the transmission slot allocated by the base station;
  wherein
  the reservation control signal generating unit generates and transmits a first reservation control signal including information about a data size of first data to be transmitted in a transmission period,
  the reservation control signal generating unit generates a second reservation control signal including information about a data size of second data to be transmitted, when the second data is generated after the first reservation control signal is transmitted, and
  the reservation control signal transmission control unit transmits the second reservation control signal at the end of the transmission period just before the data transmission unit completes transmitting the first data.

2. The mobile station as claimed in claim 1, wherein:
  the reservation control signal generating unit generates the reservation control signal including at least one of
  an information rate;
  a buffer status;
  a request for quality of service;
  a downlink channel condition; and
  transmission power.

3. The mobile station as claimed in claim 1, wherein:
  the reservation control signal transmission control unit transmits the second reservation control signal just before the data transmission unit completes transmitting the first data in a single transmission interval.

4. The mobile station as claimed in claim 1, wherein:
  the reservation control signal transmission control unit transmits the reservation control signal, when a signal for granting the reservation control signal to be transmitted is received from the base station.

5. The mobile station as claimed in claim 1, further comprising:
  a traffic type determination unit configured to determine whether data to be transmitted is randomly-generated data or regularly-generated data; wherein
  the reservation control signal transmission control unit transmits the second reservation control signal just before the data transmission unit completes transmitting the first data, when the traffic type determination unit determines that the data to be transmitted is randomly-generated data.

6. The mobile station as claimed in claim 1, wherein:
  the reservation control signal transmission control unit transmits the reservation control signal by means of any one of
  a reservation control channel;
  a dedicated control channel; and
  an upper-layer control signal.

7. A base station performing packet communications with a mobile station, comprising:
  a traffic measurement unit configured to measure traffic on an uplink channel from the mobile station to the base station;
  a transmission slot allocation determination unit configured to determine whether a transmission slot can be allocated based on the traffic on the uplink channel measured by the traffic measurement unit, when a first reservation control signal including information about a data size of first data is transmitted from the mobile station in a transmission period; and
  a second reservation control signal for requesting an allocation of the transmission slot for second data is transmitted from the mobile station at the end of the transmission period just before completing reception of first data;
  a control signal generating/transmission unit configured to generate a control signal for preventing the mobile station from transmitting the reservation control signal, when the transmission slot allocation determination unit determines that the transmission slot cannot be allocated; and
  a control signal transmission unit configured to transmit the control signal generated by the control signal generating unit.

8. The base station as claimed in claim 7, further comprising:
  a transmission timing determination unit configured to determine transmission timing at which the reservation control signal is to be transmitted, based on the traffic on the uplink channel measured by the traffic measurement unit, when the transmission slot allocation determination unit determines that the transmission slot can be allocated;
  wherein
  the control signal generating unit generates the control signal indicating that the transmission slot can be allocated,
  the control signal including the transmission timing of the reservation control signal determined by the transmission timing determination unit.

9. A mobile communication system including a mobile station and a base station performing packet communications with the mobile station, wherein:
  the base station comprises a traffic measurement unit configured to measure traffic on an uplink channel;
  a transmission slot allocation determination unit configured to determine whether a transmission slot can be allocated based on the traffic on the uplink channel measured by the traffic measurement unit, when a reservation control signal for requesting an allocation of the transmission slot is transmitted for the mobile station;

a control signal generating/transmission unit configured to generate a control signal for preventing the mobile station from transmitting the reservation control signal, when the transmission slot allocation determination unit determines that the transmission slot cannot be allocated; and a control signal transmission unit configured to transmit the control signal generated by the control signal generating unit; and the mobile station comprises a reservation control signal generating unit configured to generate the reservation control signal for requesting the allocation of the transmission slot, based on control information transmitted in advance of a data packet;

a reservation control signal transmission control unit configured to transmit to the base station the reservation control signal generated by the reservation control signal generating unit at a predetermined timing, when a transmission grant for the reservation control signal to the base station is accepted, and a data transmission unit configured to transmit data to the base station using the transmission slot allocated by the base station;

wherein the reservation control signal generating unit generates and transmits a first reservation control signal including information about a data size of first data to be transmitted in a transmission period, the reservation control signal generating unit generates a second reservation control signal including information about a data size of second data to be transmitted, when the second data is generated after the first reservation control signal is transmitted, and the reservation control signal transmission control unit transmits the second reservation control signal at the end of the transmission period just before the data transmission unit completes transmitting the first data.

10. A communication method in a mobile station and performing packet communications with a base station comprising the steps of:

generating a reservation control signal for requesting an allocation of a transmission slot;

transmitting to the base station the reservation control signal generated in the step of generating the reservation control signal; and at a predetermined timing transmitting data to the base station using the transmission slot allocated by the base station;

wherein the step of generating the reservation control signal comprises generating a first reservation control signal including information about a data size of first data to be transmitted in a transmission period, the step of generating the reservation control signal comprises generating a second reservation control signal including information about a data size of second data to be transmitted, when the second data is generated after the first reservation control signal is transmitted, and the step of transmitting the reservation control signal comprises transmitting the second reservation control signal at the end of the transmission period just before completing transmission of the first data.

* * * * *